C. P. Frazer,
Sharpening Reciprocating Saws.
N°51,168.  Patented Nov. 20, 1865.
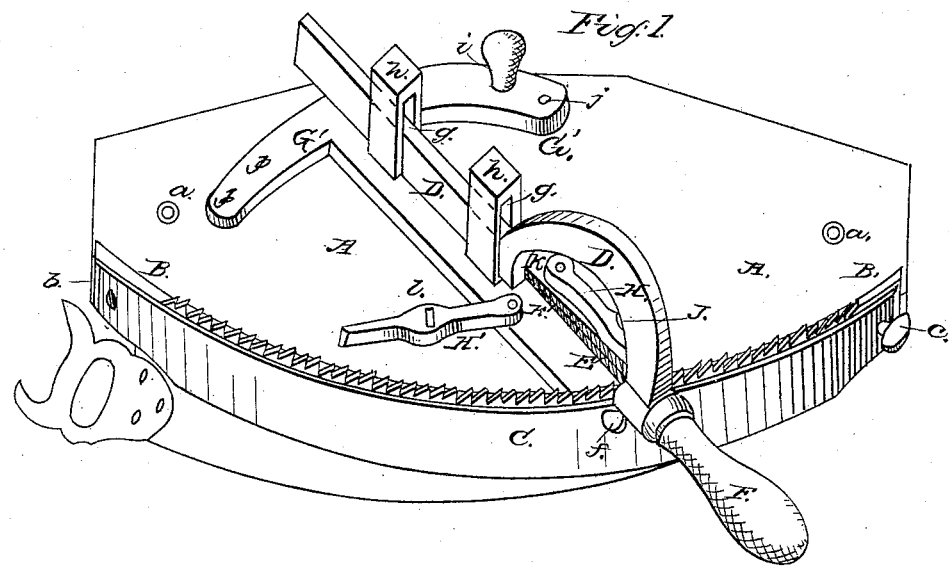
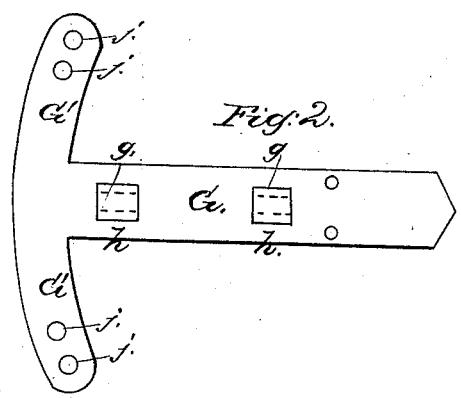
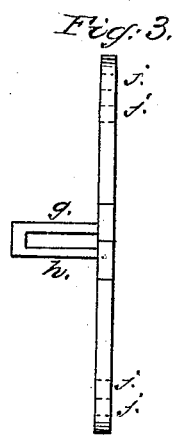
Witnesses.
Stephen Ustick
George C. Helmbold.
Inventor.
Charles P. Frazer

UNITED STATES PATENT OFFICE.

CHARLES P. FRAZER, OF ALLOWAYSTOWN, NEW JERSEY.

MODE OF SHARPENING SAWS.

Specification forming part of Letters Patent No. 51,168, dated November 28, 1865.

*To all whom it may concern:*

Be it known that I, CHARLES P. FRAZER, of Allowaystown, in the county of Salem and State of New Jersey, have invented a new and Improved Mode of Sharpening Saws; and I do hereby declare that the following is a full, clear, and exact description of the construction and operation of the same, reference being had to the annexed drawings, making a part of this specification, in which—

Figure 1 is a perspective view of the apparatus for sharpening saws, and parts in connection therewith, and a saw in position to be filed. Fig. 2 is a top view of the swivel G. Fig. 3 is an edge view of the same. Fig. 4 is a vertical longitudinal section of the file-slide D.

Like letters in all the figures represent the same parts.

The nature of my invention consists of circular clamps for holding, and, in connection therewith, a device for sharpening hand and other similar saws, which will be understood by the following description:

A is a bed-plate, which is fastened on a table or bench by means of screws which pass through the countersunk holes *a a*. The said bed-plate has a circular edge, B, against which the saw is clamped for filing, the said edge projecting upward above the bed-plate far enough to bite the saw near the roots of the teeth.

C is a spring-plate, which I make of sheet iron or steel, constituting the outer clamp, which is made to hold the saw firmly against the circular clamp B by means of the screws *b c*, the former of which always remains in position to hold one end of the clamp C, but the latter is usually removed, to provide for readily removing the saw.

D is a sliding bar, with which the file E is connected, there being a hole, *d*, in its bowed end for the reception of the handle F at the outer end of the bow, and a hole, *e*, in the inner end of the same, into which the tail end of the file is placed. There is a set-screw, *f*, for fastening the handle F, so as to keep the file steadily in position to suit the angle of the teeth. The said sliding bar D is guided by means of the slots *g g* in the uprights *h h* of the reversible swivel G, which rests upon the bed-plate A, and turns freely upon the swivel-pin *i*, so that by a movement of the swivel the file E may be placed between the teeth successively, for sharpening the same. There are holes *j* in the ends of the segmental portion G′ of the swivel G, in one of which the pin *i* is placed to give the desired angle to the file in order to produce the proper obliquity to the edges of the teeth. I have represented but two holes at each end, yet any number may be adopted.

H and H′ are adjustable fingers for holding the swivel G, only one of which is brought into requisition while filing from one side of the saw. The finger H is placed in position, as represented in Fig. 1, with its outer and angular end placed in a notch in front of a tooth to be filed, and is moved in correspondence to the successive filing of the teeth, until the filing from one side of the saw is completed, during which time the finger H′ is turned out of the way, as represented, by means of the swivel-pin *k*. Then the fingers are reversed for filing the teeth on the other side of the saw. There is a set-screw, J, for holding the fingers H and H′, firmly on the swivel G, there being an oblong hole or slot, *l*, in the fingers, through which the screw passes, so as to admit of the adjustment of the same to suit the different sizes of the teeth of the saws.

To admit of the fingers being swung back and forth without removing the set screw or screws J, the slots *l* may be opened at the inner side of the fingers.

The operation is as follows: The saw is placed in position between the clamps B and C, as represented in Fig. 1, and the swivel G placed with the proper hole *j* on the center pin, *i*, so as to produce the requisite angle to the teeth of the saw, and the finger H being properly adjusted, the front tooth is filed, and the file raised up by means of the handle F, the sliding bar D moving freely in the upright slots *g g* of the uprights or studs *h h* of the swivel G, and the swivel being turned far enough for the file to fall between the third and fourth teeth, and the finger H being placed in position between the first and second teeth, another tooth is sharpened by sliding the bar D backward and forward by means of the handle F, the file being slightly raised in its backward movements to clear the teeth; and so on, in succession, every other tooth is filed, until the handle end of the saw is reached, the outer end of the finger H being placed forward between the teeth successively to hold the swivel G steadily in position, and to insure perfect regularity in the size of the teeth. The clamp B being concentric with the pin $i$, the teeth are all filed with the same obliquity. And as the plate A is level the points of the teeth are in a straight line; but if it should be desired to make them assume a curved line, the result may readily be accomplished by curving the bed-plate along the inner side of the clamp B. When the saw is filed at one side every other tooth the swivel is reversed, so as to bring the opposite end of the segmental portion G' in connection with the pivot $i$, and the fingers H and H' are also reversed, the standing one being then placed in regular succession between the teeth. The saw is filed at the second side in like manner from the tail to the handle end of the saw.

Having described my invention, what I claim as new, and desire to secure by Letters Patent, is—

1. The combination of the concentric clamps B and C with the bed-plate A, for holding a saw in position to be filed, substantially as herein described.

2. The combination of the sliding bar D with the file E, the reversible swivel G, and fingers H and H', the whole being constructed and arranged in relation to each other and to the bed-plate A, and clamps B and C, substantially as and for the purpose set forth.

In testimony that the above is my invention I have hereunto set my hand and affixed my seal this 10th day of July, 1865.

CHARLES P. FRAZER. [L. S.]

Witnesses:
STEPHEN USTICK,
JOHN WHITE.